United States Patent [19]
Hamachi et al.

[11] Patent Number: 5,840,831
[45] Date of Patent: Nov. 24, 1998

[54] CURED SILICONE POWDER AND METHOD OF PREPARATION

[75] Inventors: Tadashi Hamachi; Kazuo Kobayashi; Yoshitsugu Morita; Kiyotaka Sawa; Ryuji Tachibana, all of Chiba Prefecture, Japan

[73] Assignee: Dow Corning Toray Silicone Co., Ltd., Tokyo, Japan

[21] Appl. No.: 910,344

[22] Filed: Aug. 13, 1997

[30] Foreign Application Priority Data

Aug. 28, 1996 [JP] Japan ................................. 8-245596

[51] Int. Cl.$^6$ ........................................................ C08F 6/00
[52] U.S. Cl. ............................ 528/488; 528/487; 524/588
[58] Field of Search ............................ 524/588; 528/488, 528/489

[56] References Cited

U.S. PATENT DOCUMENTS

| 3,742,004 | 6/1973 | Nitzsche et al. | 260/448.2 N |
| 4,483,972 | 11/1984 | Mitchell | 528/18 |
| 4,487,906 | 12/1984 | Kniege et al. | 528/15 |

*Primary Examiner*—Edward J. Cain
*Attorney, Agent, or Firm*—James L. DeCesare

[57] ABSTRACT

A cured silicone powder inhibited from evolving unpleasant odors with the passage of time, and an efficient method for preparation of the cured silicone powder, in which the surface of the cured silicone powder is treated with an alkali, by dipping the cured silicone powder in an aqueous alkaline solution.

8 Claims, No Drawings

5,840,831

CURED SILICONE POWDER AND METHOD OF PREPARATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to cured silicone powders, and methods for their preparation. More particularly, the invention relates to a cured silicone powder inhibited from evolving unpleasant odors with the passage of time, and to an efficient method for producing the cured silicone powder.

The preparation of cured silicone powder by curing and then drying, or by simultaneously curing and drying, a curable silicone composition dispersed in aqueous surfactant solution, is known (i.e., Japanese Patent Application Laid Open [Kokai or Unexamined] Numbers Sho 62-257939 [257,939/1987]; Sho 64-56735 [56,735/1989]; Sho 64-70558 [70,558/1989]; and Hei 4-168117 [168,117/1992]).

However, the problem with these cured silicone powders is that they evolve an unpleasant odor with the passage of time, due to phenomena such as oxidation of surface organic groups, and oxidation of components present in the cured material.

BRIEF SUMMARY OF THE INVENTION

An object of the present invention is to provide a cured silicone powder that is inhibited from evolving unpleasant odors with the passage of time. Another object of the present invention is to provide an efficient method for preparation of the cured silicone powder.

These and other objects of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The cured silicone powder according to the present invention is characterized in that its surface has been treated with an alkali. The method for preparation of the cured silicone powder is characterized by treating the cured silicone powder by dipping it in an aqueous alkaline solution. Thus, the characteristic feature of the cured silicone powder according to the present invention is that its surface has been treated with an alkali.

The cured silicone powder may be in the form of a gel, a rubber, or a hard resin. Its shape may be spherical, flat, disk-like, or irregular. The cured silicone powder has a particle size exemplified by a number-average particle diameter in the range from 0.1 to 200 $\mu$m.

The alkali used to treat the surface of the cured silicone powder is exemplified by alkali metal and alkaline-earth metal hydroxides such as sodium hydroxide, potassium hydroxide, and calcium hydroxide; alkali metal and alkaline-earth metal salts of inorganic acids such as sodium carbonate, sodium bicarbonate, potassium carbonate, potassium bicarbonate, sodium phosphate, and potassium phosphate; ammonia; alkali metal and alkaline-earth metal salts of carboxylic acids such as sodium acetate, potassium acetate, and sodium citrate; amine compounds such as trimethylamine, triethylamine, butylamine, and aniline; nitrogenous heterocyclic compounds such as pyridine and pyrrolidine; and mixtures of two or more alkalis such as alkali metal and alkaline-earth metal hydroxides, and alkali metal and alkaline-earth metal carboxylates. Alkali metal and alkaline-earth metal hydroxides and alkali metal carboxylates are preferred because of their good efficiency in alkali treatment. The alkali may be used for treatment as an aqueous solution or an organic solvent solution, but treatment with an aqueous solution is preferred.

We found that timewise evolution of unpleasant odor is due to groups and compounds produced by oxidation, induced by heat or UV radiation, of organic groups present on the surface of prior art cured silicone powders, as well as oxidation of components present in the cured silicone powders.

In contrast, however, the cured silicone powder according to our invention is restrained from evolving unpleasant odor with time, as a result of the chemical reaction (i.e., neutralization, decomposition) of such groups and compounds, when the surface of the cured material is treated with an alkali.

Groups and compounds which are the source of unpleasant odors are aldehyde and carboxyl groups; and aldehyde, ketone, and carboxylic acid compounds generated by oxidation of organic groups such as the alkyl and alkenyl groups bonded to the organopolysiloxane making up the cured silicone powder. Other examples of sources of unpleasant odors are aldehyde, ketone, and carboxylic acid compounds generated by oxidation of components such as surfactants present in the cured silicone powder.

While timewise generation of unpleasant odors by cured silicone powder according to the present invention is inhibited simply by an alkali treatment of its surface, an additional enhancement in inhibition of cured silicone powders can be obtained by treating the cured silicone powder with an alkali until the cured silicone powder gives a hydrogen ion exponent (pH) in aqueous ethanol solution of 6 to 8. The method for measuring this hydrogen ion exponent (pH) is carried out by using 10 weight parts of cured silicone powder dispersed in an aqueous ethanol solution (25° C.) which is prepared from 10 weight parts ethanol and 80 weight parts pure water. The measurement is made using a pH meter.

The subject preparative method is characterized by treating cured silicone powder by dipping it in an aqueous alkaline solution. The technique for preparing the starting cured silicone powder is not critical, however. In a preferred method for preparing the starting cured silicone powder, a curable silicone composition is dispersed in an aqueous surfactant solution and cured, and then it is dried. Alternatively, the curable silicone composition is dispersed in an aqueous surfactant solution and simultaneously cured and dried, as by spraying the waterborne dispersion into a hot gas current. Curable silicone compositions are exemplified by addition reaction-curing silicone compositions; dehydrogenative condensation reaction-curing silicone compositions; alcohol-eliminating condensation reaction-curing silicone compositions; and dehydration condensation reaction-curing silicone compositions. In each case, the silicone compositions cure into a gel, a rubber, or a hard resin.

The surfactant is exemplified by cationic surfactants such as primary, secondary, and tertiary aliphatic amine salts, alkyltrimethyl ammonium salts, dialkyldimethyl ammonium salts, tetraalkyl ammonium salts, trialkylbenzyl ammonium salts, alkyl pyridinium salts, N,N'-dialkyl morpholinium salts, and polyethylene polyamine fatty acid amide salts.

The surfactant is also exemplified by anionic surfactants such as fatty acid salts, alkylbenzene sulfonates, alkylnaphthalene sulfonates, alkyl sulfonates, α-olefin sulfonates, dialkyl sulfosuccinates, α-sulfonated fatty acid salts, N-acyl-N-methyl taurate, alkyl sulfuric acid salts, sulfated fats and oils, polyoxyethylene alkyl ether sulfate salts, polyoxyethylene alkylphenyl ether sulfate salts, polyoxyethylene styrenated phenyl ether sulfate salts, alkyl phosphate salts, polyoxyethylene alkyl ether phosphate salts, polyoxyethylene alkylphenyl ether phosphate salts, and naphthalene sulfonate/formaldehyde condensates.

The surfactant is further exemplified by nonionic surfactants such as polyoxyethylene alkyl ethers; polyoxyethylene alkenyl ethers; polyoxyethylene alkylphenyl ethers; polyoxyethylene polystyryl phenyl ethers; polyoxyethylene-polyoxypropylene glycols; polyoxyethylene-polyoxypropylene alkyl ethers; polyhydric alcohol/fatty acid partial esters such as sorbitan fatty acid esters, glycerol fatty acid esters, decaglycerol fatty acid esters, polyglycerol fatty acid esters, and propylene glycol-pentaerythritol fatty acid esters; polyoxyethylene polyhydric alcohol/fatty acid partial esters such as polyoxyethylene sorbitan/fatty acid esters and polyoxyethylene glycerol fatty acid esters; polyoxyethylene/fatty acid esters; polyglycerol/fatty acid esters; polyoxyethylated castor oil; fatty acid diethanolamides; polyoxyethylene alkylamines; triethanolamine/fatty acid partial esters; trialkylamine oxides; and polyoxyethylene-functional organopolysiloxanes.

Mixtures of two or more of such surfactants can also be used. The method according to our invention is most effective using nonionic surfactants, which themselves can be strong generators of unpleasant odor with elapsed time, and is particularly effective using polyoxyethylene chain-containing nonionic surfactants.

The curable silicone composition can be dispersed in the aqueous surfactant solution using a stirring device such as a homogenizer, homomixer, colloid mill, or blade-type stirrer. The cured silicone powder can be obtained by first dispersing the curable silicone composition in the aqueous surfactant solution using the stirring device, and then curing the composition. The cure can be effected by allowing the composition to stand at room temperature or by heating the composition. Cure can also be effected during drying of the aqueous surfactant solution of the curable silicone composition. Examples of some techniques for efficiently drying the cured silicone powder include drying in a heated reduced-pressure dryer, and drying in a hot-gas dryer such as a forced convection oven or a spray dryer. Drying includes heating, and drying atmospheres are exemplified by air, nitrogen, argon, helium, and carbon dioxide.

The method according to the present invention is characterized by treating prior-art cured silicone powder by dipping the cured silicone powder in an aqueous alkaline solution. The aqueous alkaline solution can be an aqueous solution of an alkali described above.

A water-soluble organic solvent such as methanol, ethanol, and acetone, can also be used for effecting dispersion of the cured silicone powder in the aqueous solution. The amount of aqueous alkaline solution used for treatment is not critical, but the amount of alkali in the aqueous solution is preferably greater than 5 weight-ppm with reference to the cured silicone powder. The concentration of the aqueous alkaline solution is also not critical. Higher concentrations provide greater effects, and can provide shorter treatment times, but higher concentrations also require more post-treatment time to remove excess alkali. Thus, the concentration must be selected as appropriate to particular circumstances.

The treatment temperature is preferably in the range of from 0° C. to 90° C. Higher temperatures provide greater effects and can provide shorter treatment times, but higher temperatures also risk scission of siloxane bonds in organopolysiloxanes making up the cured silicone powder. Thus, the temperature must also be selected as appropriate to particular circumstances.

The treatment time will vary with concentration of aqueous alkaline solution and with treatment temperature. However, dipping is continued until the hydrogen ion exponent (pH) of the aqueous ethanol solution is 6 to 8 when the cured silicone powder is dispersed in an aqueous ethanol solution after the alkali treatment. After dipping, the cured silicone powder is washed with water to remove excess alkali.

The following examples are set forth to illustrate the cured silicone powder according to the present invention and its method of preparation. The unpleasant odor determination, and the measurement of hydrogen ion exponent (pH) in aqueous ethanol were carried out as follows.

Determination of Unpleasant Odor from the Cured Silicone Powder 10 weight parts of cured silicone powder, 10 weight parts ethanol, and 20 weight parts pure water with conductivity of 0.2 $\mu$S/cm where S is siemens, were stirred for 2 minutes at 3,000 rpm using a homodisperser, and were then sealed in a 300-mL stopper-equipped glass bottle. The bottle was kept in an oven at 50° C. for 1 week. After the glass bottle had cooled to room temperature (25° C.), the presence/absence of unpleasant odor was evaluated by a 10-person panel on the following scale:

x=8 or more panelists detected an unpleasant odor other than ethanol.

+=from 3 to 7 panelists detected an unpleasant odor other than ethanol.

++=2 or fewer panelists detected an unpleasant odor other than ethanol.

Determination of the Hydrogen Ion Exponent (pH) of the Cured Silicone Powder in Aqueous Ethanol 10 weight parts of the cured silicone powder, 10 weight parts ethanol, and 80 weight parts pure water (conductivity= 0.2 $\mu$S/cm), were stirred in a homodisperser for 2 minutes at 3,000 rpm, and the hydrogen ion exponent (pH) of the aqueous ethanol solution was measured at 25° C. using a Model F-24 Horiba Limited pH meter. The reported pH value is the value measured after the pH value had stabilized after the start of its measurement.

COMPARATIVE EXAMPLE 1

An addition reaction-curing silicone rubber composition having a viscosity of 400 centipoise at 25° C., was mixed to homogeneity at 5° C. The cure of this composition yields a silicone rubber with a JIS A hardness of 37 and a specific gravity of 0.98. The composition was then rapidly mixed with 200 weight parts of pure water (conductivity =0.2 µS/cm) at 25° C., and 4 weight parts polyoxyethylene nonylphenyl ether (HLB=13.1), and this mixture was passed through a homogenizer (300 kgf/cm$^2$) to yield a homogeneous waterborne emulsion of the silicone rubber composition. This waterborne emulsion of the silicone rubber composition was held at 30° C. for 6 hours to provide a waterborne dispersion of silicone rubber powder. The waterborne dispersion of silicone rubber powder was heated for 1 hour at 80° C., and the water was then removed using a spray dryer at a discharge rate of 3 L/hour and an air temperature of 300° C. This procedure yielded a silicone rubber powder (A) with a number-average particle diameter of 4 µm. Silicone rubber powder (A) was evaluated for unpleasant odor generation and its hydrogen ion exponent (pH). The results are reported in Table 1.

COMPARATIVE EXAMPLE 2

10 weight parts of silicone rubber powder (A) prepared in Comparative Example 1 was stirred at room temperature for 1 hour at 3,000 rpm in a homodisperser, with 100 weight parts pure water (conductivity=0.2 µS/cm), followed by standing for 1.5 hours. The silicone rubber powder was then filtered off on filter paper. A slurry of the filtered silicone rubber powder, and 100 weight parts pure water (conductivity=0.2 µS/cm), was again stirred for 1 hour in the homodisperser, and then allowed to stand for 1.5 hours. Filtration of the silicone rubber powder and washing with pure water was subsequently carried out twice, yielding a slurry of the silicone rubber powder. The slurry of the silicone rubber powder was dried in an oven at 100° C. to provide silicone rubber powder (B). Silicone rubber powder (B) was evaluated for unpleasant odor generation and its hydrogen ion exponent (pH). The results are reported in Table 1.

EXAMPLE 1

10 weight parts of silicone rubber powder (A) prepared in Comparative Example 1 was stirred at room temperature for 1 hour at 3,000 rpm in a homodisperser, with a mixed solution of 100 weight parts pure water (conductivity=0.2 µS/cm), and 0.2 weight parts of a 1 weight % aqueous sodium hydroxide solution. This was followed by allowing the solution to stand for 1.5 hours. The silicone rubber powder was then filtered off on filter paper. A slurry of filtered silicone rubber powder, and 100 weight parts pure water (conductivity=0.2 µS/cm), was again stirred for 1 hour in the homodisperser, and then allowed to stand for 1.5 hours. Filtration of the silicone rubber powder and washing with pure water was subsequently carried out twice, yielding a slurry of the silicone rubber powder. The slurry of silicone rubber powder was dried in an oven at 100° C. to provide silicone rubber powder (C). Silicone rubber powder (C) was evaluated for unpleasant odor generation and its hydrogen ion exponent (pH). The results are reported in Table 1.

EXAMPLE 2

10 weight parts of silicone rubber powder (A) prepared in Comparative Example 1 was stirred at room temperature for 1 hour at 3,000 rpm in a homodisperser, with a mixed solution of 5 weight parts ethanol and 50 weight parts of a 2 weight % aqueous sodium citrate solution. This was followed by allowing the solution to stand for 1.5 hours. The silicone rubber powder was then filtered off on filter paper. A slurry of filtered silicone rubber powder, and 100 weight parts pure water (conductivity=0.2 µS/cm), was again stirred for 1 hour in the homodisperser, and then allowed to stand for 1.5 hours. Filtration of the silicone rubber powder and washing with pure water was subsequently carried out twice, yielding a slurry of silicone rubber powder. The slurry of silicone rubber powder was dried in an oven at 100° C. to provide silicone rubber powder (D). Silicone rubber powder (D) was evaluated for unpleasant odor generation and its hydrogen ion exponent (pH). The results are reported in Table 1.

TABLE 1

|  | Comparative Examples | | Present Invention | |
| --- | --- | --- | --- | --- |
|  | Comparative Example 1 | Comparative Example 2 | Example 1 | Example 2 |
| Silicone Rubber Powder | A | B | C | D |
| Presence/Absence of Unpleasant Odor | x Strong Smell of Aldehyde and Acid | + Moderate Smell of Aldehyde and Acid | ++ | ++ |
| Hydrogen Ion Exponent (pH) | 4.4 | 5.7 | 6.7 | 7.2 |

As is apparent from Table 1, cured silicone powders according to our invention are inhibited from evolving unpleasant odors with the passage of time, and the method is efficient for preparing such cured silicone powders. Such odorless cured silicone powders are particularly useful in the personal care arena where the presence of odor in consumer products is especially objectionable.

Other variations may be made in compounds, compositions, and methods described herein without departing from the essential features of our invention. The forms of invention are exemplary only and not intended as limitations on their scope as defined in the appended claims.

We claim:

1. A method of preparing a cured silicone powder inhibited from evolving unpleasant odors with the passage of time, comprising treating the surface of a silicone powder by dipping the cured silicone powder in an aqueous alkaline solution, the aqueous alkaline solution containing an alkali selected from the group consisting of alkali metal and alkaline-earth metal hydroxides; alkali metal and alkaline-earth metal salts of inorganic acids; ammonia; alkali metal and alkaline-earth metal salts of carboxylic acids; amine compounds; nitrogenous heterocyclic compounds; and mixtures of two or more alkali.

2. A method according to claim 1 wherein the cured silicone powder is prepared by curing a curable silicone composition while the curable silicone composition is dispersed in an aqueous surfactant solution and drying the cured silicone powder, or by simultaneously curing and drying a curable silicone composition while the curable silicone composition is dispersed in an aqueous surfactant solution.

3. A method according to claim 2 wherein the curable silicone composition is selected from the group consisting of addition reaction-curing silicone compositions, dehydrogenative condensation reaction-curing silicone compositions, alcohol-eliminating condensation reaction-curing silicone compositions, and dehydration condensation reaction-curing silicone compositions.

4. A method according to claim 2 in which the surfactant is a nonionic surfactant.

5. A method according to claim 4 in which the surfactant contains a polyoxyethylene chain.

6. A cured silicone powder prepared according to the method defined in claim 1.

7. A cured silicone powder according to claim 6 in which the cured silicone powder has a hydrogen ion exponent (pH) in aqueous ethanol solution of 6 to 8.

8. A cured silicone powder according to claim 7 in which the cured silicone powder is a gel, a rubber, or a hard resin.

* * * * *